April 29, 1947.  A. R. WELCH  2,419,614
COATED WOOD PRODUCT
Filed Aug. 9, 1944  2 Sheets-Sheet 1
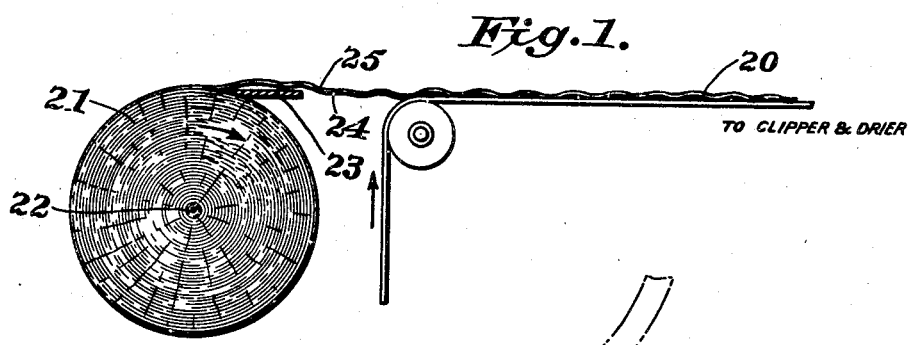
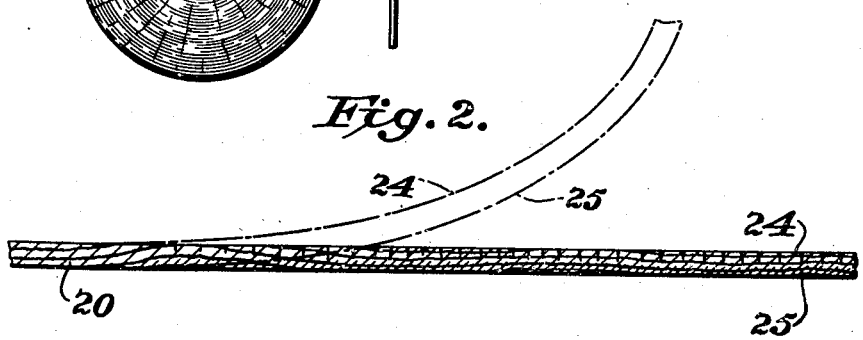
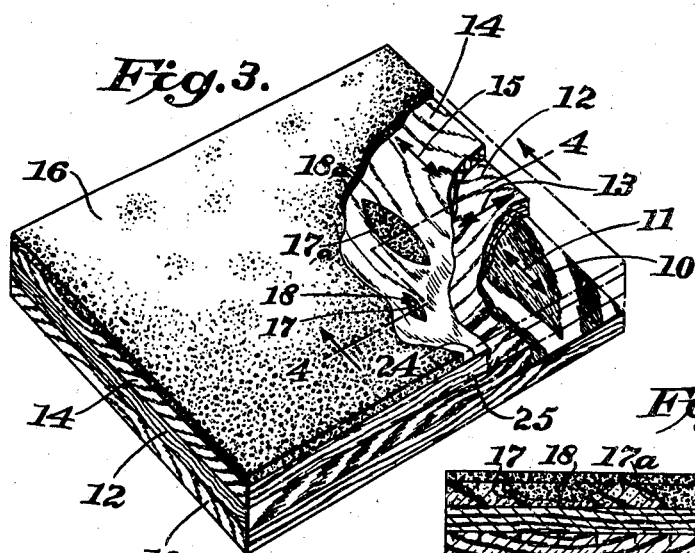
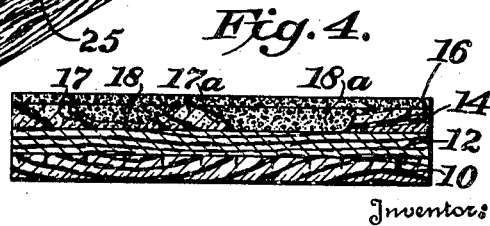
Inventor:
Arthur R. Welch,
By Cushman, Darby & Cushman
Attorneys.

Inventor:
Arthur R. Welch,
By Cushman Darby & Cushman
Attorneys

Patented Apr. 29, 1947

2,419,614

UNITED STATES PATENT OFFICE 2,419,614

COATED WOOD PRODUCT

Arthur R. Welch, Hoquiam, Wash.

Application August 9, 1944, Serial No. 548,773

6 Claims. (Cl. 20—89)

The present invention relates to a new wood product, as an article of manufacture. The product comprises a wood sheet, such as a plywood panel or the equivalent, having one or both of its faces covered with a mixture of synthetic resin and discrete wood particles consolidated under heat and pressure and bonded firmly thereto, in a layer or layers of uniform thickness and having a smooth outer surface or surfaces.

The primary object of the invention is to provide a plywood product having an improved coating or covering on one or both surfaces thereof, so that the product has improved characteristics as to appearance, durability, moisture resistance, imperviousness, strength and general utility.

A further object of the invention is to provide a plywood panel having a covering or coating on one surface only thereof, which will not warp when removed from the hot press or when subsequently subjected to changes in moisture content. The mixture of synthetic resin and discrete wood particles applied as a surface layer or covering sets up no stresses in the panel when removed from the press and apparently expands and contracts with the wood, upon changes in moisture content, since panels covered on one surface only show no tendency to warp, as is the case with panels coated on one surface only with resin impregnated paper.

Attempts have been made in the past to overcome the defects resulting from poorer and poorer qualities of veneer plies available on the market by coating the panels with resin impregnated paper, but the practice has been very expensive and quite unsatisfactory. The panels warp badly when the paper is applied to one surface only, with the result that manufacturers have resorted to the unnecessary and expensive practice of coating both surfaces of the panel with paper, even though only one surface is exposed. As stated above, the present invention provides a plywood panel, having a covering or coating on one surface only, which will not warp when removed from the hot press or when subjected to changes in moisture content.

A further object of the invention is to provide an improved plywood product which can be made as cheaply or more economically than conventional, non-coated plywood products.

A further object is to provide an improved plywood product which makes it possible to use less wood in the form of veneer plies; to use veneer plies of inferior grade, while still producing a superior product, and to utilize the tremendous waste of wood which is invariably encountered in plywood mills.

A further object of the invention is to provide a product in which the time-consuming and costly patches, universally employed in the plywood industry, are entirely or largely eliminated.

Other and further objects of the invention will be apparent to those skilled in the art from a consideration of the following description of a number of specific embodiments of the product, shown in the accompanying drawings and described below. Reference is made to my copending application Serial No. 548,774, filed August 9, 1944, for a description of a number of preferred methods of making the product and certain machines useful in those methods.

In the accompanying drawings:

Figure 1 is a diagrammatic side elevation of a conventional method of an apparatus for peeling veneer from a log.

Figure 2 is a diagrammatic view, on an enlarged scale, representing the step of straightening or flattening the peeled veneer, to make the same lie in substantially a single plane.

Figure 3 is a perspective view with parts broken away of a product in accordance with the invention.

Figure 4 is a sectional view taken on line 4—4 of Figure 3.

Figure 5:
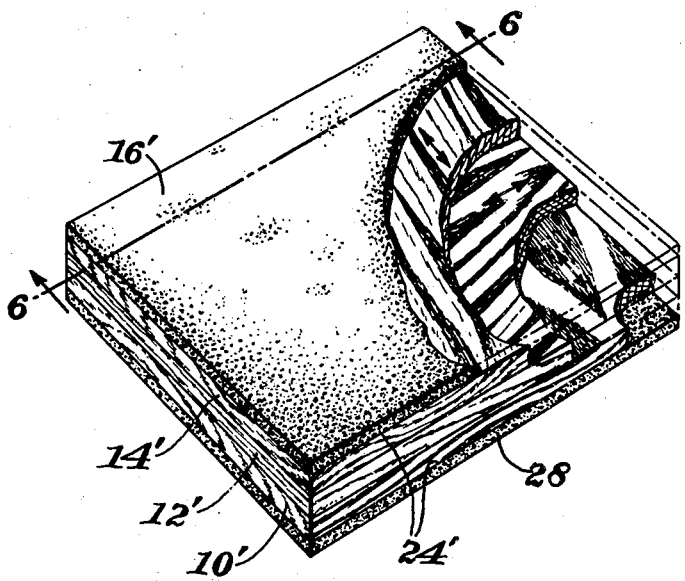
Figure 5 is a view similar to Figure 3 showing a modification.

The product, as shown in Figure 3, comprises a lower face ply 10 of peeled veneer, such as Douglas fir veneer, arranged with the grain running in the direction of the arrow 11; another ply 12 of similar veneer disposed thereon with the grain running transversely, as indicated by the arrow 13; an upper ply 14, of similar veneer, with the grain running parallel to the grain in the lower ply as indicated at 15; and an upper covering 16 of a mixture, as hereinafter described, bonded to the ply 14 under heat and pressure. Of course, the invention is not limited to a three ply plywood panel, since one or more plies may be employed, as in standard plywood. The plies 10, 12 and 14 are adhesively united by a suitable adhesive, similar to those used in the plywood art, such as waterproof, synthetic resin glues, water-resistant, protein glues, such as those made from soybean meal or casein, or conventional hide glue. In most cases a heat setting, synthetic resin is preferred, such as No. 442, manufactured and sold by I. F. Laucks, Inc.

The layer 16 is a mixture of synthetic resin and wood particles, such as sawdust, which should be carefully graded and blended as to particle size, to produce the effect desired in the finished product, as explained in the above-mentioned method application. The resin may be in the liquid state, or dissolved in a solvent, or may be in relatively dry, powdered form. The moisture content of the wood particles and the synthetic resin impregnating agent are preferably maintained as low as is practical, to prevent the creation of steam pockets, or the emission of substantial volumes of steam from the product during its consolidation in the hot press.

The layer or covering of the mixture 16 fills all of the low spots, fissures and minor defects in the surface of the upper ply 14, since it is pressed thereinto under very substantial heat and pressure in the hot press, during the consolidation of the product. The upper surface of the layer is preferably smooth and uniform, as a result of the use in the press, of a smooth metal sheet overlying or underlying the layer of the mixture, as the case may be. The plate is stripped from the product after the pressing operation, as described in the above-mentioned application.

As indicated in Figures 3 and 4, defects 17 in the top ply 14 may be filled with a body 18 of a mixture similar or identical to the covering 16, thereby making it unnecessary to cut out the defects and to fill the cut-out openings with separately made veneer patches, as is conventional in the plywood industry. Instead of using veneer wood patches, which are always cut from the best available veneer stock, the present invention contemplates patches made of a synthetic resin and a sawdust mixture. In some cases the defects are cut out, as previously, and the openings 17a filled with the loose mixture 18a and consolidated under heat and pressure, before the veneer plies are assembled with other plies to make a plywood panel, while in other cases, if the defects 17, such as knot-holes, rosin pockets, checks and the like are not too serious, the cavities may be simply filled with the mixture 18, before or simultaneously with the application of the covering 16. If the defects are cut out, as indicated at 17a, the patching material may be disposed and consolidated by heat and pressure applied thereto before the veneer plies are assembled, or the openings may be filled and the mixture set during the pressing of the plies together, and/or during the final bonding of the mixture covering 16 to the surface. A plywood product having the defects in one of the outer plies filled or patched with a mixture of synthetic resin and wood particles is thought to be entirely novel.

As represented diagrammatically in Figure 1, it is conventional practice in the plywood industry to peel a long sheet or ribbon 20 from a log 21, positively rotated about its axis 22, by the use of a knife 23 which is gradually fed toward the heart of the log as the same rotates. The inner face 24 of the veneer strip so produced, which was formerly nearer the heart of the log and which was concave when first peeled, is known in the trade as the back face of the veneer, and the outer face 25, which was formerly nearer the bark of the log, and which was convex when first peeled is known as the front face. Since the veneer is peeled from a cylindrical surface, it naturally has a tendency to curl and to return to such a surface. When it is flattened, as indicated in Figure 2, the wood fibers on the front face are placed under lateral compression and the fibers on the back face are placed under lateral tension, with the result that, on the latter face, they are separated somewhat and minute fissures or cracks are formed between the fibers or between bundles of fibers. Hence, the front face is more tightly compacted than the back face and the latter is more pervious, because of the fissures and the laterally stretched or separated condition of the fibers.

It has been the universal practice in the plywood art to dispose the front face 25 of the veneer plies outwardly, so that the tightly compacted, non-fissured surface is exposed. I have discovered that this universal practice is responsible for certain troubles and undesirable phenomena encountered in the use of plywood, which have previously not been understood. When plywood panels with the front face of the veneer disposed outwardly, are subjected to changes in moisture content, the grain swells outwardly, because of the tight lateral compacting of the fibers. This grain raising is undesirable, particularly when the panels are coated with paint or paper, since it makes the grain clearly visible through the coating material. Also, when coating materials such as paper are applied under a high consolidating pressure, the grain tends to rise upon release of the pressure, with the result that the grain shows through the paper covering.

I have discovered that a plywood panel made with the back face disposed outwardly is not subject to this undesirable grain raising. This phenomenon may be explained by the fact that the wood fibers, being non-compressed, are capable of expanding laterally instead of outwardly, into the minute fissures on the surface between the fibers or bundles of fibers. Hence, when a coating material such as paper or paint is applied, the grain will not show through, upon an increase in the moisture content of the wood, or upon the release of high consolidating pressure.

Moreover, I have found that the back face 24 of a veneer ply provides an improved surface for the reception of the layer 16. The mixture of sawdust and synthetic resin, or portions of the synthetic resin constituent thereof, penetrate and fill the minute fissures of the back face when the veneer plies are arranged as shown in the accompanying drawings, that is, with the surface 24 of the upper ply disposed outwardly in contact with the covering mixture and with the front face 25 of the ply disposed inwardly in contact with the core ply.

Figure 6:
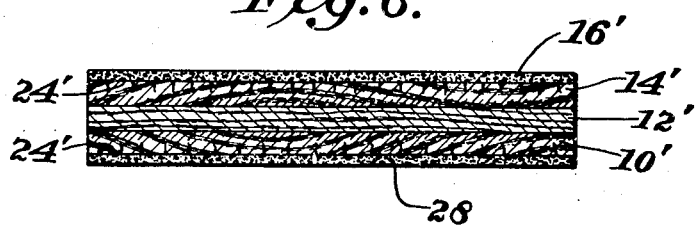
Figure 6 is a sectional view taken on line 6—6 of Figure 5.

If a panel having both of its surfaces covered with the mixture, as shown in Figures 5 and 6 is to be made, I prefer to have both face plies 10' and 14' arranged with their back faces 24' disposed outwardly, for the reception of layers 16' and 28 which may be applied to the surfaces as described in the aforementioned application.

In any event, whether the front or back faces of the plies are disposed outwardly, to receive the covering mixture of the present invention, the surface is preferably left in its original, somewhat rough, non-sanded condition, to provide a surface which makes a better bond with the mixture and to eliminate the very substantial waste of wood which is inherent in the conventional sanding operation.

Preferably, the veneer plies are cut thinner than standard plies used in the manufacture of a corresponding grade of plywood panel. The undersized plies are assembled to make a panel of less thickness than standard, and the thickness is built up to standard by the addition of a layer or layers of the mixture, applied to one or both faces of the panel. By peeling veneer of less thickness from the log, the production of the log is correspondingly increased, and the waste inherent in the sanding operation is eliminated.

For instance, if a three-ply ⅜ inch panel is to be produced, the wood plies should be less than ⅛ of an inch thick, instead of slightly more, as is the case with conventional plywood. These plies may be assembled to produce a panel 5/16 inch thick, and a layer of the mixture, 1/16 inch thick after compacting, added to bring the panel up to standard. According to conventional practice, a panel 7/16 inch is first made, and then 1/16 inch is removed during the sanding operation.

The covering or overlay material of the present invention may consist of mixtures of sawdust and synthetic resin in portions of from 50 to 1 to 1 to 1. The wood particles are of appreciable size, as distinguished from wood floor and paper making fibers, and preferably comprise a blend of graded sawdust and sander dust which will pass through screens ranging from 4 inch mesh to 16 mesh, or smaller.

The mixture may be widely varied as to composition and proportion of ingredients. Coloring pigments or dyes may be added to give the finished product any desired color. The mixture is an exellent vehicle for fireproofing materials of known types, and if properly incorporated therein will render the product of the present invention highly resistant to fire. It has been found that, when such agents are included during the mixing operation, they become a permanent part of the covering and do not leach out when exposed to air and water. Hence, the product retains its fire-resistant characteristics substantially indefinitely.

The invention is not limited to any particular resins or impregnating agents, except that heat-setting synthetic resins are preferred. Condensation type resins such as phenol-formaldehyde, urea and furfural are entirely suitable. Also, addition type polymers, such as diallyl phthalate and vinyl methacrylate are advantages in certain cases.

The invention is not limited to the specific details of construction described above and illustrated in the accompanying drawings, but covers all modifications coming within the scope of the appended claims and their equivalents.

I claim:

1. A plywood product comprising veneer plies adhesively joined together into a plywood panel with at least one outer ply having fissures, cracks and other imperfections in its outer surface, and a continuous layer of substantial thickness of a mixture of synthetic resin and discrete wood particles on said surface, said layer being of sufficient thickness to fill the fissures, cracks and other imperfections in said surface, yet presenting a smooth, even, continuous, planar, substantially permanent outer surface spaced from said outer surface of the panel, the layer being bonded to said panel surface under heat and pressure by the conversion of the resin therein.

2. A plywood product comprising veneer plies adhesively joined together into a plywood panel with at least one outer ply having its outer surface in the rough, non-sanded condition as peeled from the log and having fissures, cracks and other imperfections therein, and a continuous layer of substantial thickness of a mixture of synthetic resin and discrete wood particles on said surface, said layer being of sufficient thickness to fill the fissures, cracks and other imperfections in said surface, and yet presenting a smooth, even, continuous, planar, substantially permanent outer surface, spaced from the said outer surface of the panel, the layer being bonded to said panel surface under heat and pressure by the conversion of the resin therein.

3. A plywood product comprising veneer plies adhesively joined together into a plywood panel, with at least one outer ply of peeled veneer with the back, inside, finely fissured surface thereof, which was formerly nearer the heart of the log, disposed outwardly and being in the original, relatively rough, non-sanded condition and having fissures, cracks and other imperfections therein, and a continuous layer of a mixture of synthetic resin and discrete wood particles on said surface, said layer being of sufficient thickness to fill the fissures, cracks and other imperfections in said surface, yet presenting a smooth, even, continuous, planar, substantially permanent outer surface spaced from the said outer surface of the panel, the layer being bonded to said rough, finely fissured surface under heat and pressure by the conversion of the resin therein.

4. A plywood product comprising veneer plies adhesively joined together into a plywood panel with at least one outer ply having fissures, cracks and other imperfections in its outer surface and a defective hole or opening extending through said ply, a patch for said hole or opening comprising a mixture of synthetic resin and discrete wood particles filling the hole or opening and bonded to the margins thereof under heat and pressure by the conversion of the resin therein, and a continuous layer of substantial thickness of a mixture of synthetic resin and discrete wood particles on said outer surface of said outer ply, said layer being of sufficient thickness to fill the fissures, cracks and other imperfections in said surface and covering said patch, yet presenting a smooth, even, continuous, planar substantially permanent outer surface spaced from said outer surface of the panel, the layer being bonded to said panel surface and to said patch under heat and pressure by the conversion of the resin therein.

5. A plywood product comprising veneer plies adhesively joined together into a plywood panel having the same number of plies as, but being of less thickness than a corresponding standard plywood panel with at least one outer ply having fissures, cracks and other imperfections in the outer surface thereof, and a continuous layer of substantial thickness of a mixture of synthetic resin and discrete wood particles on said surface, said layer being of sufficient thickness to raise the thickness of the composite panel to said standard thickness and to fill the fissures, cracks and other imperfections in said surface, yet presenting a smooth, even, continuous, planar, substantially permanent outer surface spaced from the said outer surface of the panel, the layer being bonded to said panel surface under heat and pressure by the conversion of the resin therein.

6. A plywood product comprising veneer plies adhesively joined together into a plywood panel having the same number of plies as, but being of less thickness than a corresponding standard plywood panel with at least one outer ply having its outer surface in the rough, non-sanded condition as peeled from the log and having fissures, cracks and other imperfections therein, and a continuous layer of substantial thickness of a mixture of synthetic resin and discrete wood particles on said rough, non-sanded surface, said layer being of sufficient thickness to raise the thickness of the composite panel to said standard thickness and to fill the fissures, cracks and other imperfections in said surface, yet presenting a smooth, even, continuous, planar, substantially permanent outer surface spaced from said rough, non-sanded outer surface, the layer being bonded to said rough, non-sanded surface under heat and pressure by the conversion of the resin therein.

ARTHUR R. WELCH.

REFERENCES CITED

The following references are of record in the file of this patent:

UNITED STATES PATENTS

| Number | Name | Date |
|---|---|---|
| 1,903,768 | Kennedy | Apr. 18, 1933 |
| 2,066,734 | Loetscher | Jan. 5, 1937 |
| 2,192,129 | Ellis | Feb. 27, 1940 |
| 820,221 | Lindley | May 8, 1906 |
| 1,657,280 | Proctor | Jan. 24, 1928 |
| 2,337,792 | Yokell | Dec. 28, 1943 |